US005680762A

United States Patent [19]

Reid

[11] Patent Number: 5,680,762

[45] Date of Patent: Oct. 28, 1997

[54] HYDRAULIC CIRCUIT CONTROLLING AN ACTUATOR

[75] Inventor: Brian Reid, Southampton, England

[73] Assignee: Trinova Limited, New Hampshire, England

[21] Appl. No.: 540,056

[22] Filed: Oct. 6, 1995

[30] Foreign Application Priority Data

Oct. 10, 1994 [GB] United Kingdom .................. 9420394

[51] Int. Cl.[6] .............................. F16D 31/02; F15B 11/08

[52] U.S. Cl. ................................ 60/468; 60/494; 91/446; 91/448; 91/432

[58] Field of Search .............................. 91/444, 446, 447, 91/448, 432; 60/468, 494

[56] References Cited

U.S. PATENT DOCUMENTS

| | | | |
|---|---|---|---|
| 3,999,386 | 12/1976 | Crull et al. | 60/494 X |
| 4,204,460 | 5/1980 | Andersen et al. | 91/447 |
| 5,088,283 | 2/1992 | Bosniac | 60/494 X |
| 5,209,063 | 5/1993 | Shirai et al. | 91/447 X |
| 5,440,967 | 8/1995 | Wennerbo | 91/446 X |
| 5,460,001 | 10/1995 | Kato et al. | 91/446 X |
| 5,490,442 | 2/1996 | Rub et al. | 91/448 X |

*Primary Examiner*—Hoang Nguyen
*Attorney, Agent, or Firm*—Barnes, Kisselle, Raisch, Choate, Whittemore & Hulbert, P.C.

[57] ABSTRACT

An hydraulic circuit controlling an actuator including a main signal branch which includes a pump (11), a valve (12) and an actuator (18) coupled in series, the valve being responsive to first and second applied biasing pressures (19,23), the first biasing pressure being operable to bias the valve (12) into a closed position and the second biasing pressure being operable to bias the valve into an open position; an auxiliary branch (20,21,22) connected in parallel with the actuator (18); the first biasing pressure (19) being derived from the main signal branch downstream of the valve (12) and the second biasing pressure being derived from the auxiliary branch.

6 Claims, 3 Drawing Sheets

HYDRAULIC CIRCUIT CONTROLLING AN ACTUATOR

The present invention relates to an hydraulic circuit which controls an actuator. The present invention has particular, but not exclusive, application to plant machinery, for example, excavators.

Such machines, when excavating below ground level, often encounter obstructions such as subterranean pipes or power cables. Ideally, the excavator should respond to the increased resistance to the progress of the digging implement by disabling it in order to prevent damage.

The conventional control circuits employed in excavators fall into two categories: open centre and closed centre circuits.

A conventional open centre control circuit automatically causes the digging implement to stall on encountering an obstruction, thereby preventing damage. The disadvantage of this type of circuit is that it requires the operator to adjust continually the restrictance of the circuit driving the digging implement.

A conventional closed centre circuit avoids the need for continual manual intervention by the provision of pressure compensation. Pressure compensation maintains the metered flow rate at a constant level related to a command signal.

Figure 1:
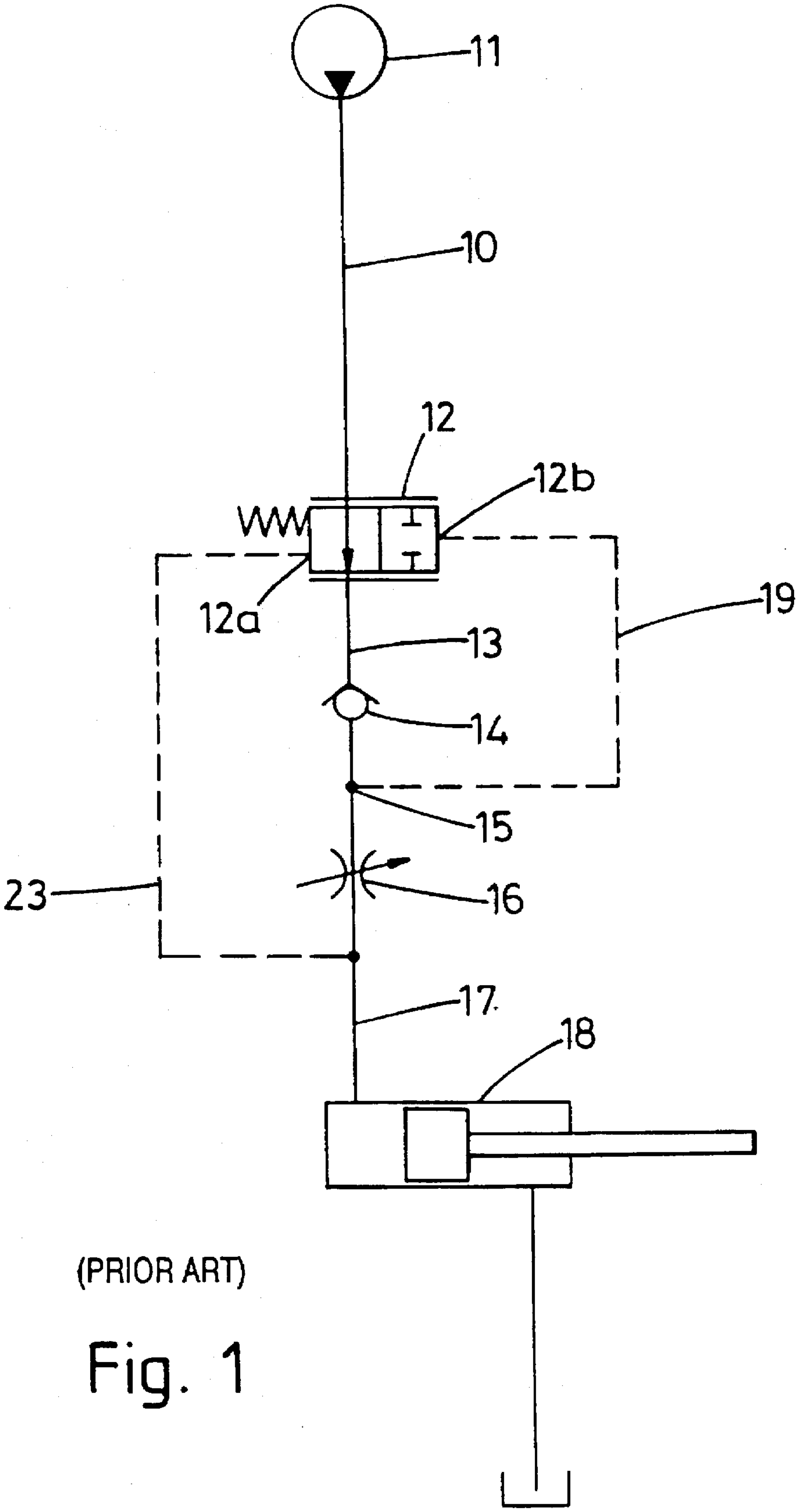
(PRIOR ART) Fig. 1

FIG. 1 shows a circuit schematic of a conventional closed centre control circuit.

The circuit comprises a main signal branch made up of an hydraulic pump 11 coupled, in series, with a valve 12; a check valve 14; a variable restriction 16; and a linear actuator 18. Although not shown, both in this Figure and the other Figures a variable restriction is included between the actuator 18 and tank to prevent runaway of the actuator. The pump 11 can typically be a fixed or variable displacement pump and is connected to the valve 12 via a line or conduit 10. The line 10 serves as an inlet for the valve 12, and a line 13 which connects to the check valve 14 serves as an outlet.

The valve 12 includes a valve member which is biased by a spring into an open position in which flow is permitted from the line 10 to the line 13. The valve 12 also includes a pair of biasing ports **12*a*, 12*b* through which the position of the valve member can be adjusted by the application of fluid pressure. Positive pressure applied to the biasing port 12*a* assists in maintaining the valve member in an open position, and positive pressure applied to biasing port 12*b* opposes the action of the spring and serves to bias the valve member into a closed position. Thus, it will be appreciated that the valve member can occupy an infinite number of positions between open and closed depending on the relative magnitude of the pressures applied to the biasing ports 12*a*, 12*b*** and the properties of the spring.

A line 15 connects the check valve 14 to the variable restriction 16, and a line 17 connects the variable restriction 16 to the line actuator 18. The variable restriction is controllable by the operator. The circuit further comprises feedback lines 19 and 23. Feedback line 19 connects line 15, immediately upstream of the variable restriction 16, to the biasing port **12*b* and feedback line 23 connects line 17, immediately downstream of the variable restriction 16, to the biasing port 12*a***.

When the load on the actuator 18 increases, for example, because the digging implement encounters an underground obstruction, the pressure in line 17 increases. This causes equal increases in pressure on both sides of the variable restriction 1, but there is no change in the restrictance of the valve 12. Thus, valve 12 compensates for the increased load on the actuator 18 by increasing the pressure applied to the actuator. In this way, damage can be caused when an obstruction is encountered.

The present invention has an object of overcoming the aforementioned disadvantage of the prior art.

Throughout the specification the term 'actuator' is to be construed so as to include actuators which convert fluid pressure into linear motion i.e. linear actuators, and those which convert fluid pressure into rotary motion i.e. motors.

The present invention provides an hydraulic circuit controlling an actuator comprising:

a main signal branch which includes a pump, a valve and an actuator coupled in series, the valve being responsive to first and second applied biasing pressures, the first biasing pressure being operable to bias the valve towards a closed position and the second biasing pressure being operable to bias the valve towards an open position;

an auxiliary branch connected in parallel with the actuator;

the first biasing pressure being derived from the main signal branch downstream of the valve and the second biasing pressure being derived from the auxiliary branch via a first line.

By the provision of these features, when the actuator encounters an increase in load, the first biasing pressure from the main signal branch increases by a greater amount than the second biasing pressure from the auxiliary branch, whereby the valve tends towards its closed position. If the increase is sufficiently large, the valve can completely shut-off, whereby the actuator stalls.

In another embodiment of the invention, the main signal branch further includes a restriction coupled, in series, between the valve and the actuator, the auxiliary branch also being in parallel with the restriction and the first biasing pressure is derived from upstream of the restriction. In this embodiment, the circuit further comprises a second line providing unidirectional communication between the first line and the actuator.

Viewed from another aspect, the invention is considered to reside in a first fluid control circuit for an actuator, the control circuit including a valve for controlling fluid flow to the actuator, the setting of the valve being determined by mutually counter-acting pressure connections applied to an adjustable member of the valve, characterised in that a first said pressure connection interconnects said member and a point in the circuit intermediate the valve and actuator whereby to bias the valve in one direction in dependence on the loading of the actuator; and in that a second said pressure connection interconnects the adjustable member and a point in the circuit isolated from pressure changes influenced by the loading on the actuator whereby to bias the valve in another direction.

Preferably, the fluid pressure in each pressure connection is controllable independently of the loading on the actuator.

Conveniently the control circuit includes a further valve and actuator as aforesaid, arranged in a circuit as aforesaid and connected in parallel with the first fluid control circuit, whereby to provide flow compensation between the two parallel circuits when the loading on one said actuator differs from the loading on another said actuator.

The invention also resides in a control circuit as aforesaid when configured as a spool valve.

Figure 2:
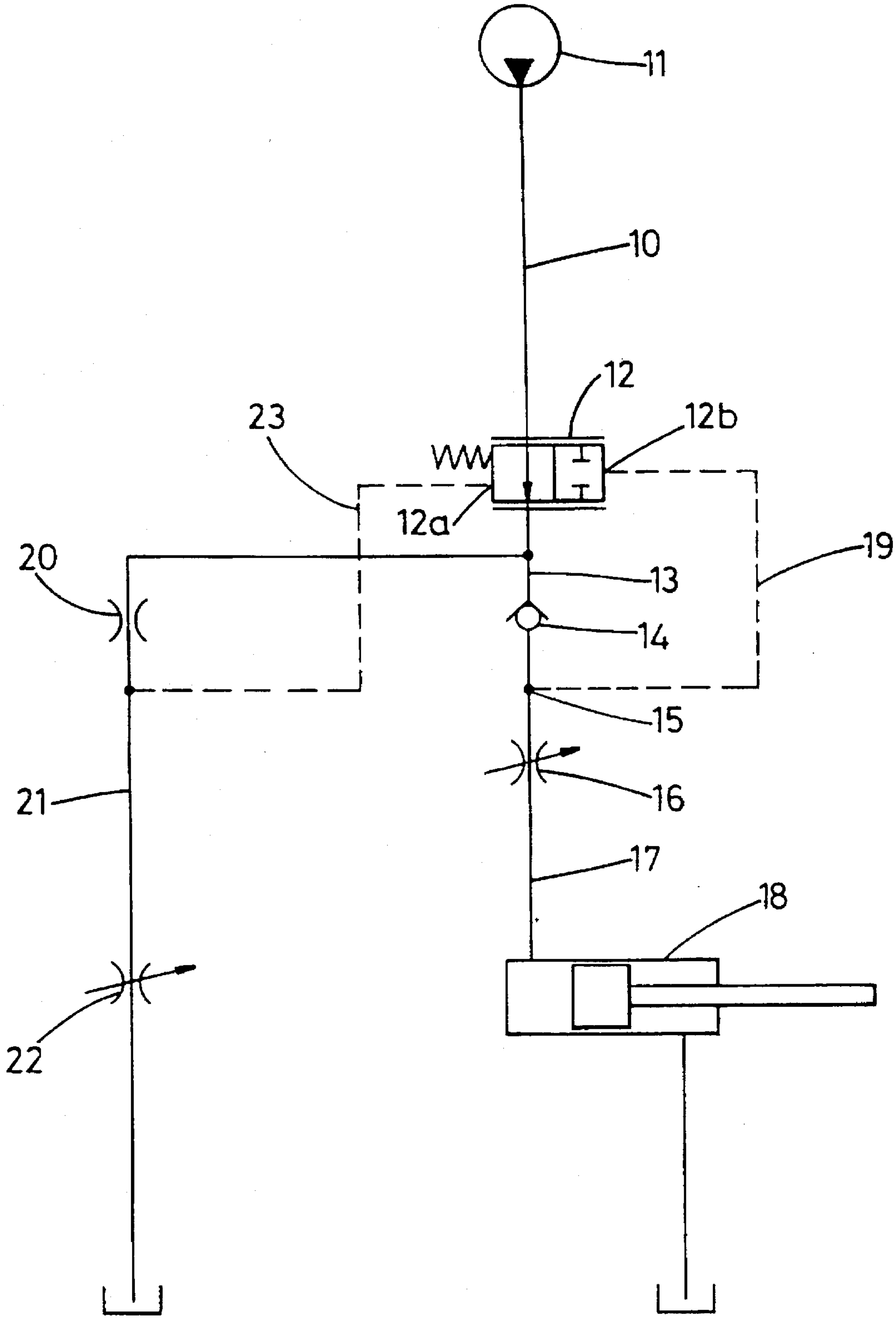
Figure 3:
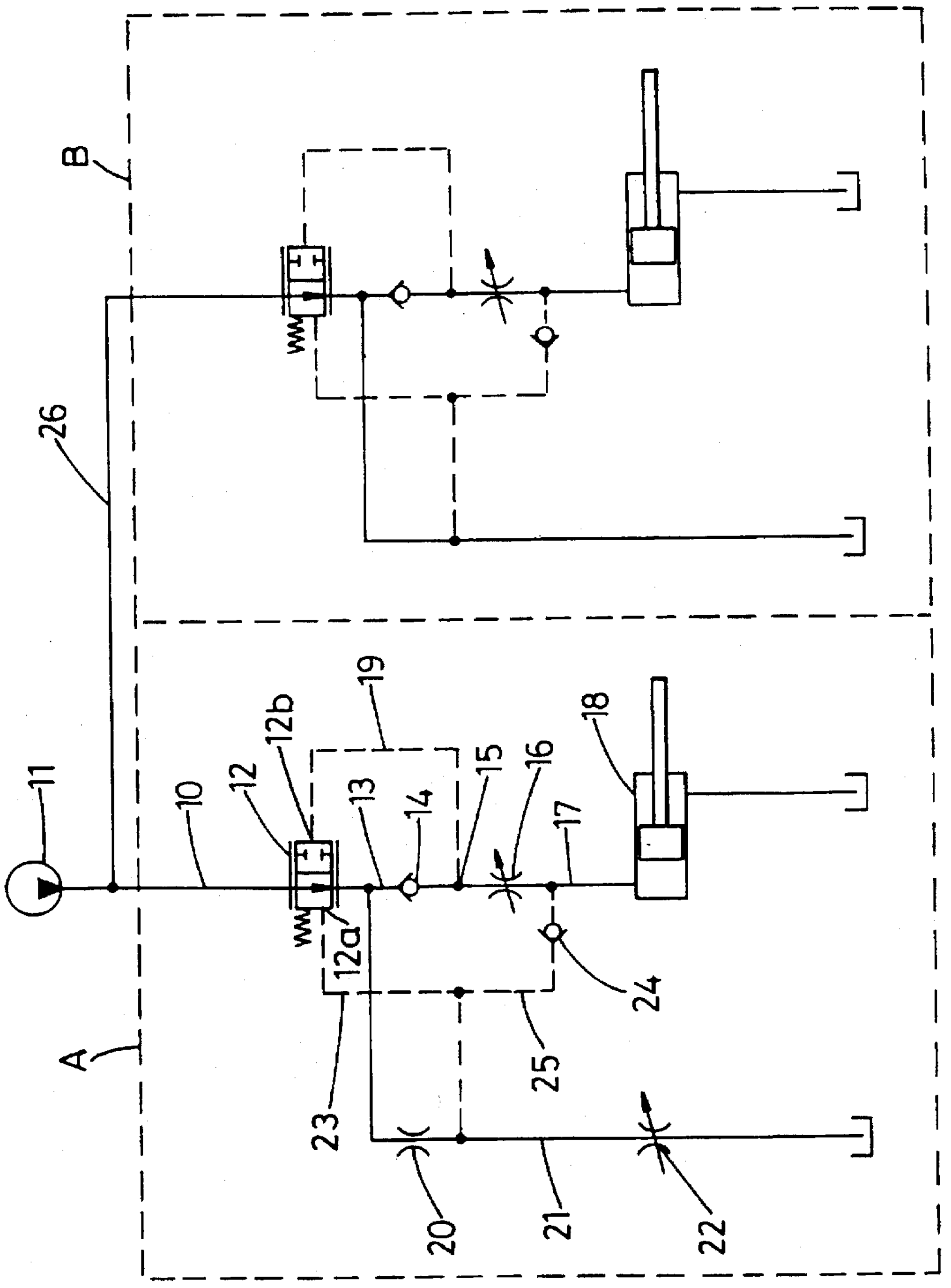

Exemplary aspects of the present invention are hereinafter described with reference to the accompanying drawings, in which FIG. 2 shows a circuit schematic of a first embodiment of the invention, and FIG. 3 shows a circuit schematic of a second embodiment of the invention.

In these figures, where parts correspond to similar parts in FIG. 1, the same reference numeral has been used.

Referring to FIG. 2, it will be seen that the first embodiment of the invention comprises the circuit of FIG. 1 modified by including an auxiliary branch, including a restriction 20 and a variable restriction 22, which is connected in parallel with the check valve 14, the variable restriction 16 and the linear actuator 18 between line 13 and tank. The line connecting restrictions 20 and 22 is designated 21. The first embodiment also differs from that in FIG. 1 in that one end of line 23 now connects to line 21 instead of line 17. The restrictance of restriction 22 is selected to be much greater than that of restriction 20 such that the pressure in line 23 is largely governed by the restrictance of restriction 22.

In practice, the variable restrictions 16,22 may be implemented by a single circuit element. The element comprises a cylindrical casting, defining a pair of channel with inlets and outlets, within which a spool is mounted for axial movement. The axial displacement of the spool adjusts the effective size of each channel. Each channel corresponds to a restriction 16 or 22 and has a restrictance inversely related to the restrictance of the other channel, which is also a function of spool design.

Under steady state conditions, when hydraulic fluid (oil) is flowing from the pump 11 to the linear actuator 18 through the main signal branch 10,12,13,14,15,16 and 17, restrictions 16,22 permit the passage of fluid therethrough. The feedback lines 19,23 hold the valve 12 in equilibrium.

When the load increases, a corresponding pressure rise is experienced in lines 17,15,19,13 and 10. However, restriction 20 prevents the pressure in line 21 increasing correspondingly. As a result, the balance of pressure acting on valve 12 via the biasing ports **12*a*, 12*b* is disturbed, whereby as the pressure increase on line 19 has not been matched with a corresponding increase on line 23,21, because of the relative magnitude of the restrictance of restrictions 20,22, the valve member is moved against its spring load towards its closed position. The magnitude of this biasing pressure difference can be sufficient to completely close the valve 12 and thus block the flow path along the main signal branch and thus stall the actuator 18**.

From this stall condition, pressure balance can only be restored by increasing the throttling effect of restriction 22 (by moving the spool), and re-opening the valve and restarting the actuator.

Thus, it will be appreciated that the first embodiment allows the actuator to stall when the load pressure increases above a value determined by the spool position and requires the operator to override this stall signal by selecting the spool to a new position.

A disadvantage of the circuit architecture of the first embodiment becomes apparent when it is employed in a multi-service environment, i.e. where a number of actuators are connected in parallel and driven from a single pump 11. If one actuator is operating at a high pressure and another at a lower pressure, the lower pressure actuator will take a higher proportion of the total pump flow. This results in the individual actuators experiencing similar problems to those experienced by a conventional open centre control circuit.

FIG. 3 shows a second embodiment of the invention which attempts to remedy this problem. It shows two services A and B connected in parallel by line 26, each service being controlled by an identical circuit. In other embodiments of the invention, the high pressure service can have a prior art circuit architecture, such as that shown in FIG. 1. The circuit differs from that shown in FIG. 2 by the addition of line 25 which connects line 23 to line 17 and a non-return check valve in the line 25. Line 25 joins line 17 downstream of the main metering restriction 16.

The advantage of this arrangement is apparent if it is assumed that service A is operating with a low load pressure in line 17 and service B is operating with a higher load pressure. At first sight, the service A should take a higher proportion of the pump flow.

The connection from line 23 through the check valve 24 to line 17 ensures that if the pressure in line 26 increases, as the pressure in line 23 increases, a flow is established from line 23 through line 25 to line 17. This effectively prevents the pressure at line 23 from increasing above the pressure at line 17 and, therefore, guarantees flow compensation as now described.

Considering service A, for the valve 12 to perform its flow control function, the pressure in line 23 being applied to the biasing port **12*a* must be equal to the pressure in line 17. (This may be understood with reference to FIG. 1 in which such a connection exists). When pressure in line 23 equals the pressure in line 17, the pressure acting on line 19 is equal to the pressure raised on parallel line 26 acting through the valve 12, line 13, check valve 14 and line 15. This pressure is now substantially higher than the pressure applied by line 23 and the equivalent pressure to overcome the valve spring, and this causes the valve member to move towards the more closed or throttled position. This throttled position will increase automatically the restriction to flow until the overall restrictance from the parallel line 26 to low pressure line 17** effectively balances the restrictance of the two operating services, thus preserving the desired division of pump flow therebetween.

When the load on the actuator 18 increases, the pressure in line 17 increases correspondingly. The check valve 24 prevents this pressure increase from being transmitted directly to the bias port 12a and the pressure along lines 15,13,10 and 26 increases. As explained above, an increase in pressure in line 26 above that in line 23 results in either a complete closing off of the valve 12, whereby the actuator stalls, or an increased restriction to flow through the valve 12.

Thus, this embodiment retains all the benefits of the FIG. 2 embodiment, and restores, depending on the position of the spool, i.e. the size of restrictions 16,22, some degree of flow control. It establishes a trade-off between good pressure control and poor flow control at one extreme of spool position, and poor pressure control and good flow control at the other extreme of spool position.

Although the present invention has been described with heavy emphasis on its use in excavators, the present invention can also be applied to other fields.

What is claimed is:

1. An hydraulic circuit controlling an actuator comprising:

a main signal branch which includes a pump, a valve and said actuator coupled in series, the valve being responsive to first and second applied biasing pressures, the first biasing pressure being operable to bias the valve towards a closed position and the second biasing pressure being operable to bias the valve toward an open position;

an auxiliary branch connected in parallel with the actuator;

the first biasing pressure being derived from the main signal branch downstream of the valve and the second biasing pressure being derived from the auxiliary branch via a first auxiliary branch including means for progressively adjusting the restrictance thereof between an open and a closed condition, whereby to permit stalling of the actuator during operation.

2. The circuit of claim 1, wherein the main signal branch further includes a restriction coupled, in series, between the valve and the actuator, the auxiliary branch is also in parallel with the restriction, and the first biasing pressure is derived from upstream of the restriction, the circuit further comprising a second line providing unidirectional communication from the first line to the actuator.

3. A first fluid control circuit for an actuator, the control circuit including a valve for controlling fluid flow to said actuator, the setting of the valve being determined by mutually counteracting biasing pressure connections applied to an adjustable member of the valve, characterised in that a first said pressure connection interconnects said member and a point in the circuit intermediate the valve and actuator whereby to bias the valve in one direction in dependence on the loading of the actuator; and in that a second said pressure connection interconnects the adjustable member and a point in the circuit isolated from pressure changes influenced by the loading on the actuator whereby to bias the valve in another direction, the pressure at said point being smoothly adjustable.

4. A fluid control according to claim 3 wherein the fluid pressure in each pressure biasing connection is controllable independent of the loading on the actuator.

5. A fluid control circuit according to claim 3 including a further valve and a further actuator, the further valve controlling fluid flow to the further actuator and the further valve and further actuator being arranged in a second circuit and connected in parallel with the first fluid control circuit whereby to provide flow compensation between the first and second circuits when the loading on one said actuator differs from the loading on the other said actuator.

6. A fluid control circuit according to any one of the preceding claims wherein the valve is configured as a spool valve.

* * * * *